(No Model.) 2 Sheets—Sheet 1.

J. CASTELL.
REFRIGERATOR.

No. 255,142. Patented Mar. 21, 1882.

WITNESSES

INVENTOR (No Model.)  
2 Sheets—Sheet 2.

J. CASTELL.
REFRIGERATOR.

No. 255,142. Patented Mar. 21, 1882.

WITNESSES  
INVENTOR  
James Castell  
By Myers & Co.  
Attorneys

UNITED STATES PATENT OFFICE.

JAMES CASTELL, OF MACON CITY, MO., ASSIGNOR TO JAMES B. MELONE AND THOMAS EDWIN SHARP, OF SAME PLACE; SAID MELONE AND SHARP ASSIGNORS OF ONE-THIRD TO JOHN SHEPHERD, OF SAME PLACE.

REFRIGERATOR.

SPECIFICATION forming part of Letters Patent No. 255,142, dated March 21, 1882.

Application filed November 28, 1881. (No model.)

*To all whom it may concern:*

Be it known that I, JAMES CASTELL, a citizen of the United States, residing at Macon City, in the county of Macon and State of Missouri, have invented certain new and useful Improvements in Refrigerating-Rooms and Refrigerators, of which the following is a specification, reference being had therein to the accompanying drawings, in which—

Figure 1:
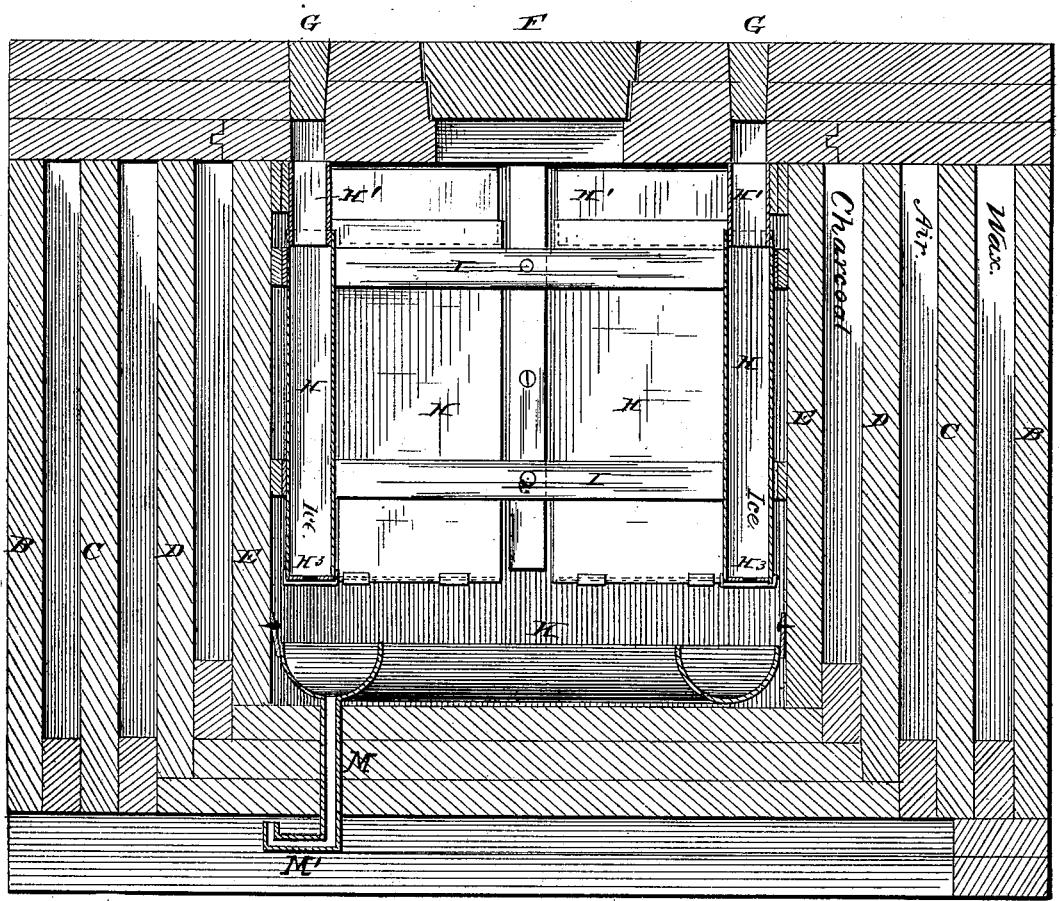
Figure 2:
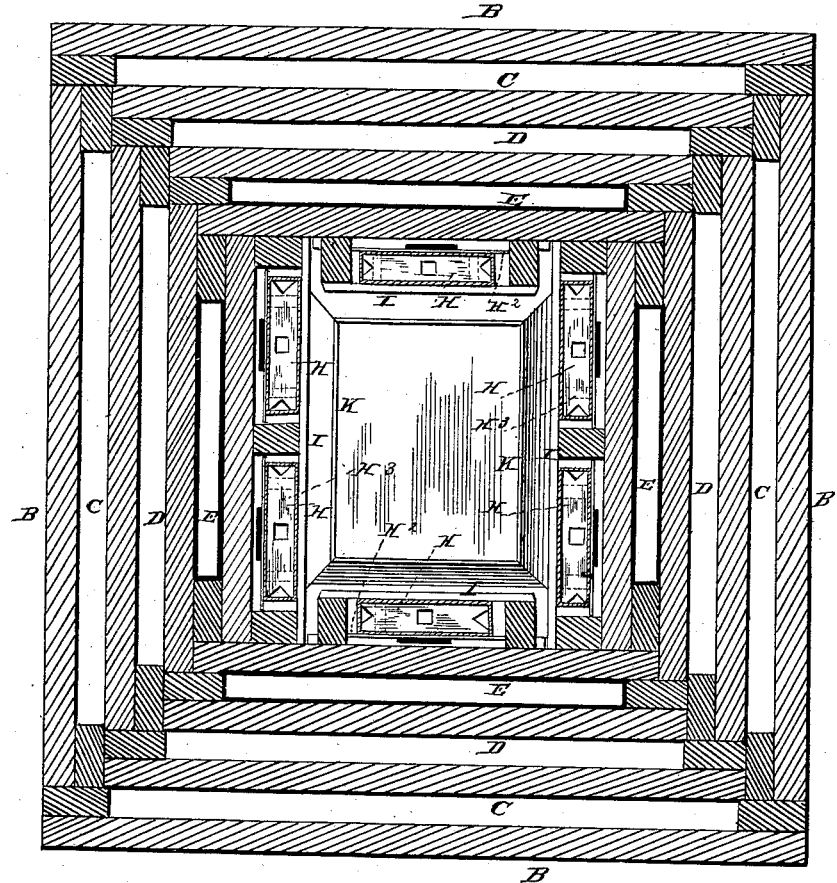
Figure 3:
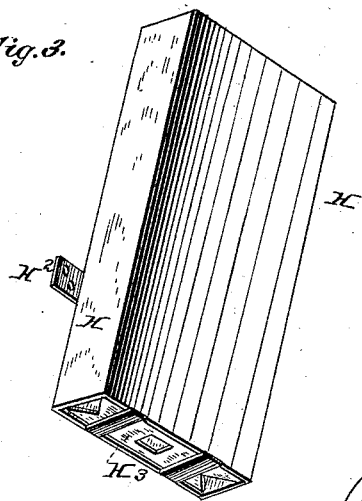

Figure 1 is a vertical section of my improved refrigerating-room and refrigerator. Fig. 2 is a horizontal section. Fig. 3 is a detailed view, showing one of the removable ice-pans.

This invention has relation to improvements in refrigerating-rooms and refrigerators; and it consists of the combination and arrangement of parts, substantially as hereinafter more fully set forth and claimed.

In carrying out my invention I employ four spaced-apart walls, lettered B C D E. The space between the walls B and C is filled with rosin and tallow mixed together and boiled. This filling excludes moisture and prevents the penetration through the walls of the heat and the escape of cold therefrom. The space between the walls C and D forms an air-chamber, being filled with dead air, which serves as a non-conductor of heat or cold, which further prevents the penetration of the walls by heat and the escape of cold therefrom. The walls of the space between D and E are lined with tarred paper, and the space is then filled with powdered charcoal or ground coal-cinders.

F is the central door in the top of the room or refrigerator, constructed, as is also the bottom, with the same number of spaced-apart walls, with the intervening spaces similarly treated as the above-described side walls. In the top are also a number of smaller doors or lids, G, arranged in line with the ice-pans.

H H are the ice pans or receptacles, arranged one on each side of the inner or central chamber, and capable of removal when desired to be renewed, or for other purpose. These pans have each partially inserted therein the brackets H', connected to the side of the aforesaid chamber, and then further detachably fastened in position by inserting screws or similar means through metallic straps or plates $H^2$ thereof and causing them to enter the side or wall of the chamber. The pans have removable perforated bottoms $H^3$, resting on cross-bars thereof, to permit of the ready cleaning of the pans. The ice is placed in the pans in a crushed state. They are guarded or protected by bars or strips I, suitably secured in position to the sides of the chamber, as shown. These pans for refrigerating purposes are filled with crushed ice and salt in such quantities as the desired degree of cold may render requisite, and with crushed ice and gasoline in such relative quantities as to produce any required degree of cold when the articles to be preserved are protected from the action of the gasoline.

A drip-pan, K, of rectangular form, is placed in the bottom of the chamber to receive the dripping water from the pans, from which it is drained off through an opening in the bottom of the refrigerator or room. The pan K is constructed with waste-pipe M, leading therefrom and connected therewith, the waste-pipe M having an air-trap formed by the double elbow M', in order that the pipe may always be filled with water at the bottom thereof, drained from the pan, thereby excluding the air from the chamber of the refrigerator.

It will be noticed that the several walls of the refrigerator or room are caused to break joints with each other, as does also each side wall with the other, to render it perfectly air-tight.

Among other purposes, this room is for keeping in a state of preservation, especially in warm weather, market-chickens, all kinds of game, and fresh meats, it being adapted to so reduce the temperature of its storing-chamber as to effect the freezing of its contents in a few hours.

I claim and desire to secure by Letters Patent—

1. In a refrigerant-room and refrigerator, the walls B C D E, having an intermediate dead-air chamber and an intermediate space filled with boiled rosin and tallow, lids G, and ice-pans H, having brackets H' inserted therein, substantially as shown, and for the purpose described.

2. The ice-pan H, having removable perforated bottom H³, resting on cross-pieces of the pan, substantially as and for the purpose set forth.

In testimony whereof I affix my signature in presence of two witnesses.

JAMES CASTELL.

Witnesses:
C. H. PAYSON,
JOHN SHEPHERD.